United States Patent
De Toffol

(10) Patent No.: US 6,476,087 B1
(45) Date of Patent: Nov. 5, 2002

(54) METHOD OF MANUFACTURING SYNTACTIC FOAM

(76) Inventor: Roberto De Toffol, 55 Athena Avenue, St. Ives, New South Wales, 2075 (AU)

( * ) Notice: Subject to any disclaimer, the term of this patent is extended or adjusted under 35 U.S.C. 154(b) by 91 days.

(21) Appl. No.: 09/697,091

(22) Filed: Oct. 26, 2000

(30) Foreign Application Priority Data

Jun. 20, 2000 (AU) .............................................. PQ8241

(51) Int. Cl.$^7$ .............................. C08J 9/32; C08J 9/224; C08J 9/232; C08J 9/236
(52) U.S. Cl. .......................... 521/54; 521/135; 521/178; 521/57; 523/218; 523/219
(58) Field of Search .......................... 521/54, 135, 178, 521/57; 523/218, 219

(56) References Cited

U.S. PATENT DOCUMENTS

| | | | |
|---|---|---|---|
| 3,832,426 A | 8/1974 | Malthouse et al. | ........... 264/29 |
| 3,849,350 A | * 11/1974 | Matsko | |
| 5,120,769 A | 6/1992 | Dyksterhouse et al. | ....... 521/54 |
| 5,432,205 A | 7/1995 | Arnold, Jr. et al. | ............ 521/54 |

OTHER PUBLICATIONS

Bunn, P., et al., "Manufacture and Compression Properties of Syntactic Foams", *Composites*, vol. 24, No. 7, pp. 565–571, (Nov. 7, 1993).

Kenig, S., et al., "Three–Phase Silicone Based Syntactic Foams", *Journal of Cellular Plastics*, vol. 20, No. 6, pp. 423–429, (Nov.–Dec. 1984).

Kim, H.S., "Manufacture of Syntactic Foam", *Manuscript to be submitted to International Workshop on Fracture Mechanics and Advanced Materials*, 7 pages, (Dec. 8–10, 1999).

Narkis, M., et al., "Rotational Molding of Thermosetting Three–Phase Syntactic Foams", *Polymer Engineering and Science*, vol. 22, No. 7, pp. 417–421, (May 1982).

Narkis, M., et al., "Syntactic Foams III. Three–Phase Materials Produced from Resin Coated Microballoons", *Journal of Cellular Plastics*, vol. 18, No. 4, pp. 230–232, (Jul./Aug. 1982).

Puterman, M., et al., "Syntactic Foams I. Preparation, Structure and Properties", *Journal of Cellular Plastics*, vol. 16, No. 4, pp. 223–229, (Jul./Aug. 1980).

* cited by examiner

*Primary Examiner*—Morton Foelak

(57) ABSTRACT

A method of manufacturing syntactic foam is disclosed which includes the steps of combining a polymer, microspheres and a solvent to form a slurry. At least a portion of the solvent is removed through a porous wick, and conditions are applied which substantially solidify the polymer.

31 Claims, 3 Drawing Sheets

METHOD OF MANUFACTURING SYNTACTIC FOAM

FIELD OF THE INVENTION

Figure 1:
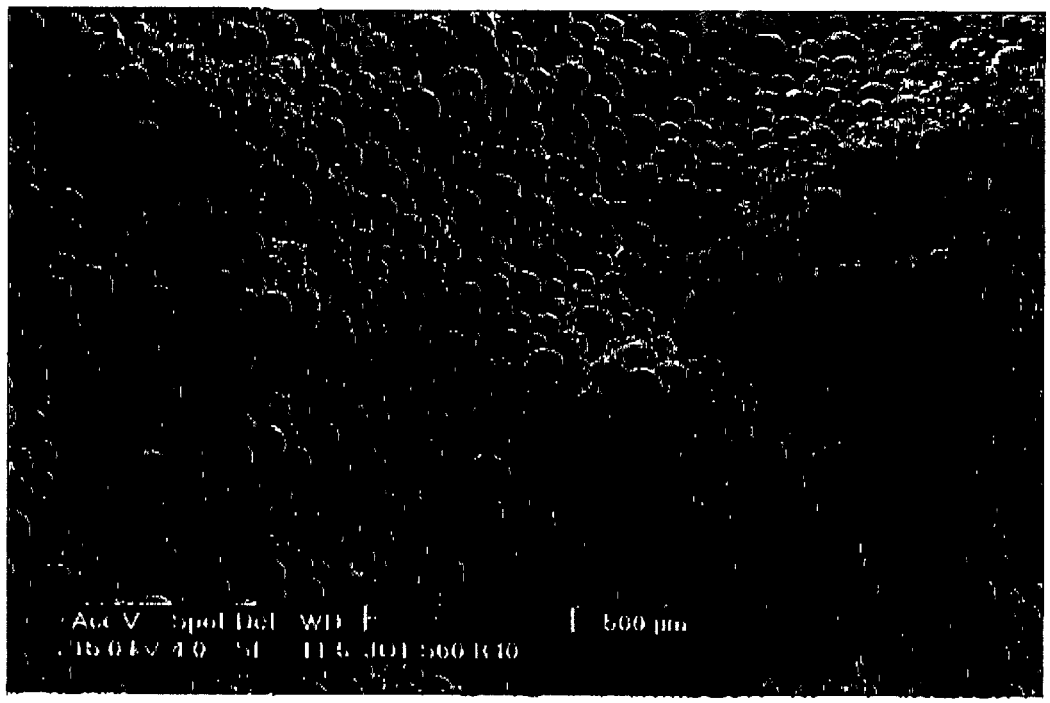

The present invention relates generally to syntactic foams and more particularly to an improved method of manufacturing syntactic foam.

BACKGROUND OF THE INVENTION

Syntactic foams are composite materials whose resinous matrix is embedded with preformed particles such as glass or ceramic microspheres. Syntactic foams distinguish themselves from other foams by the fact that hollow or solid spheres of a predetermined size and packing composition are used to control the density of the foam.

Syntactic foams have been used for purposes which require a low density packing material such as undersea/marine equipment for deep-ocean current-metering, anti-submarine warfare, sandwich composites, the aerospace industry and the automotive industry.

Examples of syntactic foams in the prior art include for example U.S. Pat. No. 5,120,769 which discloses syntactic foams having an insoluble matrix, and U.S. Pat. No. 3,832,426 which discloses foam having an insoluble matrix and carbon microspheres. Syntactic foams having a soluble polymer matrix are disclosed in U.S. Pat. No. 5,432,205.

Difficulties have been experienced, however, in producing syntactic foams that have a density which is comparable to conventional foams. Typical densities of syntactic foams vary between 0.3 and 0.5 g/cm$^3$, whilst conventional foams typically vary between 0.01 and 0.1 g/cm$^3$. The density of syntactic foams has generally been restricted by the limited porosity of the foams. Porosity is a measure of the total void volume of the syntactic foam, and constitutes the sum of the void volume of the microspheres and the interstitial void volume. Using current methods of syntactic foam manufacture, the void volume provided by the microspheres is greater than the void volume provided by the interstitial spaces. Thus, the density of syntactic foams have been limited by the void volume of the microspheres. As such, the application of syntactic foams have been limited.

SUMMARY OF THE INVENTION

An aim of the present invention is to provide a novel method of manufacturing syntactic foam which is ideally suitable for manufacture of low density foams and which is simple and inexpensive.

Accordingly, in a first aspect of the invention, there is provided a method of forming a syntactic foam including the steps of:

a) combining a polymer, microspheres and a solvent to form a slurry;

b) thereafter removing at least a portion of the solvent through a porous wick; and c) applying conditions which substantially solidify the polymer.

The applicant has found that by manufacturing syntactic foams in accordance with the method of the invention, it is possible to provide adequate coating of the microspheres to form the syntactic foam using a high microsphere mass fraction. This occurs primarily by the solvent reducing the viscosity of the polymer thereby allowing less polymer to be used to coat the microspheres and by causing at least a portion of the solvent to be removed from the composition. The applicant has found that using this method the porosity of the interstitial void volume of the syntactic foams can be greater than the void volume of the microspheres. This enables syntactic foam densities of less than 0.15 g/cm$^3$ to be produced. Further, the technique is simple and is ideally suited for mass production and easily applicable for manufacturing large items.

In a preferred form, the method further includes the steps of combining the polymer and the microspheres to form a paste, and thereafter adding the solvent to the paste to form the slurry and mixing the slurry to achieve dispersion of the microspheres prior to removal of the solvent. Even more preferred is that a final portion of microspheres necessary to maintain the desired mass fraction is added alternatively with the solvent. This helps to maintain a consistency which allows easy pouring.

In a preferred aspect of the invention, the solvent is removed from the slurry while the slurry is in a mould such that the syntactic foam forms a desired physical conformation upon removal of the solvent. In an especially preferred aspect of the invention, the syntactic foam is made by a method in which the mould is the porous wick for removal of the solvent. The porous wick itself may be made from any material that is capable of soaking up or removing the solvent. The most preferred porous wick is made of plaster. Alternatively, the porous wick may be made of clay, ceramic, cement, concrete, finely perforated plastic or metallic sheets with absorbent backing, fine metallic mesh/gauze with absorbent backing, rigid porous foams or sponge-like material.

An advantage of this arrangement is that the removal of the solvent through the mould walls does not cause any major disturbance of the distribution of the microspheres. As such, the resulting syntactic foam is able to maintain an even density and tactile strength.

To allow for ease of moulding and speed of manufacture, the amount of solvent added is sufficient to form a slip by maintaining a soupy consistency. The mixture can then be quickly poured into the desired mould.

It is a preferred aspect of the present invention that the solvent is a volatile alcohol or ketone. The most preferred alcohols are butyl alcohol, isopropyl alcohol, ethyl alcohol or methyl alcohol. Even more preferred is that the solvent is the ketone acetone. Alternatively, the solvent may be water or a mixture of water and alcohol or water and acetone. In general, a slip made using water requires a lower ratio of solvent to polymer and hardener. The volume ratio of water to polymer is generally between 9:1 and 6:1. The volume ratio of acetone to polymer is between 40:1 and 9:1. The volume ratio of water to polymer and acetone to polymer varies with the ratio of microspheres to polymer. The greater the ratio of microspheres to polymer, the greater the volume of solvent required to maintain a consistency necessary to allow pouring of the mixture. Ideally, the volume ratio of solvent to polymer is sufficient to maintain a slip.

The polymer may be dissolved in the solvent, or dispersed throughout the solvent as a suspension. In a preferred aspect of the invention, the polymer is dissolved in the solvent. It is especially preferred that the polymer is dissolved in acetone. Alternatively, the polymer is homogenised or dispersed throughout the solvent as an insoluble suspension.

The polymer used in the method of making the syntactic foam of the present invention may be any resin that is effectively employed in syntactic foam manufacture. The classes of resins used for syntactic foam manufacture may include but is not restricted to amino resins, epoxide resins, phenolic and other tar acid resins, urea and melamine resins, vinyl resins, styrene resins, alkyd resins, acrylic resins, polyethylene resins, polypropylene resins, petroleum polymer resins, polyamide resins, polycarbonate resins, acetal resins, flourohydrocarbon resins, polyester resins and polyurethane resins. Further, the polymer may be water soluble copolymers such as poly(N-vinylpyrrolidone-vinyl acetate). A particularly preferred resin is a phenolic resin.

Depending on the nature of the polymer, the polymer may include a crosslinking agent or hardener which causes solidification of the polymer material. In cases where the polymer includes a cross-linker to solidify, it is preferred that the weight ratio of hardener to polymer is 1:10. However, it is envisaged that the ratio of hardener to polymer will vary depending on the type of polymer and the degree of crosslinking that is desired. For example, increased amounts of hardener will allow low temperature curing and will speed up gelation. Decreasing the relative amounts of polymer to a weight ratio as low as 5:100 may be possible, but higher curing temperatures and longer gelation times may be required.

Preferably, the syntactic foam of the present invention is a low density syntactic foam. To reduce the density of the syntactic foam, the microspheres are advantageously hollow gas filled spheres. They are generally made of soda-lime-borosilicate glass, but may also be made from, but not limited to, any one of the following types: carbon, ceramic, phenolic, epoxy or melamine-formaldehyde. For some applications it is envisaged that the microspheres used in the method of the present invention will be thermoplastic. The microspheres may be untreated or precoated. Preferably, the surface of the microspheres is precoated with a coupling agent, such as a silane coupling agent. The microspheres may also be dried prior to use. It is also envisaged that the syntactic foam of the present invention may also comprise a non homogenous mixture of microspheres made of different compounds.

As indicated above, the porosity of the syntactic foam is a combination of the void volume of the microspheres and the interstitial void volume between the microspheres. An advantage of the preferred form of the invention is that the method allows for high interstitial void volume to be produced because adequate coating of the microspheres can occur using low amounts of polymer. The method also does not induce forces in the mix that results in increased packing of the microspheres. As such, it is possible using the method of the invention to lower the density of the syntactic foam by creating a high interstitial void volume. The applicant has found that the density of the syntactic foam produced by the method of the present invention is lowest when the interstitial void volume is greater than the total void volume of the microspheres. Thus, the greater proportion of porosity in the low density syntactic foam of the present invention results from the interstitial voids between the microspheres.

In a preferred aspect of the invention, the microspheres are less than 420 micrometers in diameter. More preferably they are less than 300 micrometers. Even more preferably they are less than 150 micrometers in diameter. To vary the density of the syntactic foam and to obtain tighter packing of the microspheres, the method of making syntactic foam can use microspheres of different sizes. In a preferred aspect of the invention, small microspheres are mixed with large microspheres to produce a closely packed syntactic foam with a high microsphere volume fraction.

The density and mechanical strength of the syntactic foam can be controlled by the weight-ratio of microspheres to polymer. Depending on the structural properties required, the weight ratio of microspheres to polymer is typically between 8:2 and 2:8. It is preferred that the weight ratio of microspheres to polymer is between 8:2 and 1:1. A more preferable weight ratio of microspheres to polymer is between 8:2 and 6:4. Still even more preferred is a weight ratio of microspheres to polymer of between 8:2 and 7:3. However, weight ratios of microspheres to polymer of between 1:1 and 2:8 are also effective in producing a syntactic foam. Lower ratios of microspheres to polymer results in a denser foam with greater mechanical strength. In the case of foams of greater mechanical strength, weight ratios of between 4:6 and 2:8 are preferred. For greater mechanical strength, weight ratios of between 3:7 and 2:8 are preferred. It is likely that the effective ratio of microspheres to polymer will vary with the properties of the polymer and the microspheres employed. Accordingly, polymers with greater wettability may be effective at weight ratios of greater than 8:2.

Preferably, the density of the syntactic foam produced by the method of the present invention is between 0.05 and 0.5 g/cm$^3$. Even more preferably, the density of the syntactic foam is between 0.055 g/cm$^3$ and 0.15 g/cm$^3$.

The polymer and microspheres may be mixed by any method which provides sufficient dispersion of the microspheres through the polymer but does not damage a proportion of the microspheres. The method of mixing the polymer/microsphere mixture with the solvent may be any method which results in dispersion of the microspheres throughout the mixture or slip. It should be noted that the method of mixing the microspheres and polymer need not be the same as the method of mixing the polymer/microsphere mix with the solvent. It is however preferred due to ease of manufacture that the polymer and microspheres are mixed in the same manner as the solvent and polymer/microspheres.

Following removal of the solvent through the porous wick, the syntactic foam of the present invention may be treated under conditions to cure or solidify the polymer. These may be conditions such as elevated or lowered temperature, stillness, catalytic activity, or any other conditions which allow solidification of the polymer. The conditions will vary with the type of polymer used. The preferred condition is temperature. The temperature used to cure the polymer may be any temperature which does not damage the polymer or the microspheres. The temperature will vary depending on the type of polymer used and the nature of the microspheres or the solvent. Preferably, the temperature will be between 0° and 60° C. Even more preferably, the temperature will be between 20° and 35° C. Prior to heating, the majority of the solvent is preferably removed through/by the porous wick. Thus, heating should be only sufficient to allow curing of the resin. This will reduce damage to both the resin and the microspheres.

In yet a further aspect, the present invention relates to a syntactic foam when made by any form of the method of the first aspect of the invention discussed above.

The following examples are provided as illustrative of the present invention and are not intended to limit its scope in any way.

EXAMPLES

Example 1

Resinox CL1916 phenolic resin was mixed with AH2070S acid hardener in a weight ratio of 100 parts resin to 10 parts hardener and mixed by hand using a bowl and a wooden spatula for a period of 2 minutes. A portion of an equivalent mass of 3M Scotchlite K1 soda-lime-borosilicate glass spheres were added slowly to the mixture to form a smooth viscous paste. Acetone was added to maintain a smooth consistency, and a further portion of the microspheres was added, followed by additional acetone. This process of alternating between addition of microspheres and acetone was continued until a mass of microspheres equivalent to the mass of resin had been added. The total volume of acetone added was twenty milliliters. The mixture was then gently stirred for 8 minutes, and subsequently poured into a plaster mould. The specimen was then placed in an oven at 30.9° C. for a period of 24 hours. At this stage, the specimen was fully cured.

The resulting syntactic foam has the following properties:

| | |
|---|---|
| Sphere volume fraction | 0.310 |
| Resin volume fraction | 0.032 |
| Void fraction | 0.658 |
| Sphere Mass Fraction | 0.50 |
| Resin mass fraction | 0.50 |
| Foam Density (g/cm³) | 0.077 |
| Tactile Toughness | Medium |
| Colour | Pearl White |

Example 2

Resinox CL1916 phenolic resin was mixed with AH2070S acid hardener in a weight ratio of 100 parts resin to 10 parts hardener and mixed by hand using a bowl and a wooden spatula for a period of 3 minutes. 3M Scotchlite K1 soda-lime-borosilicate glass spheres were added slowly to the mixture to form a smooth viscous paste. Acetone was added to maintain a smooth consistency, and a further portion of the microspheres was added, followed by additional acetone. This process of alternating between addition of microspheres and acetone was continued until a mass fraction of spheres to resin of 0.60 to 0.40 was obtained. The mixture was stirred to maintain a smooth paste. The total amount of acetone added was twenty five milliliters. The mixture was then gently stirred for 12 minutes, and subsequently poured into a plaster mould. The specimen was then placed in an oven at 50° C. for a period of 24 hours. At this stage, the specimen was fully cured.

The resulting syntactic foam has the following properties:

| | |
|---|---|
| Sphere volume fraction | 0.433 |
| Resin volume fraction | 0.030 |
| Void fraction | 0.537 |
| Sphere Mass Fraction | 0.60 |
| Resin mass fraction | 0.40 |
| Foam Density (g/cm³) | 0.090 |
| Tactile Toughness | Medium |
| Colour | Pearl White |

Under scanning electron microscopic examination, the syntactic foam had few broken spheres and a good microsphere packing structure as can be seen in FIG. 1.

Example 3

Resinox CL1916 phenolic resin was mixed with AH2070S acid hardener in a weight ratio of 100 parts resin to 10 parts hardener and mixed by hand using a bowl and a wooden spatula for a period of 3 minutes. 3M Scotchlite K1 soda-lime-borosilicate glass spheres were added slowly to the mixture to form a smooth viscous paste. Acetone was added to maintain a smooth consistency, and a further portion of the microspheres was added, followed by additional acetone. This process of alternating between addition of microspheres and addition of acetone was continued until a mass fraction of spheres to resin of 0.70 to 0.30 was obtained. The mixture was stirred to maintain a smooth paste. The total amount of acetone added was twenty milliliters. The mixture was then gently stirred for 10 minutes, and subsequently poured into a plaster mould. The specimen was then placed in an oven at 50° C. for a period of 24 hours. At this stage, the specimen was fully cured.

The resulting syntactic foam has the following properties:

| | |
|---|---|
| Sphere volume fraction | 0.411 |
| Resin volume fraction | 0.018 |
| Void fraction | 0.571 |
| Sphere Mass Fraction | 0.70 |
| Resin mass fraction | 0.30 |
| Foam Density (g/cm³) | 0.073 |
| Tactile Toughness | Soft |
| Colour | Pearl White |

Figure 2:
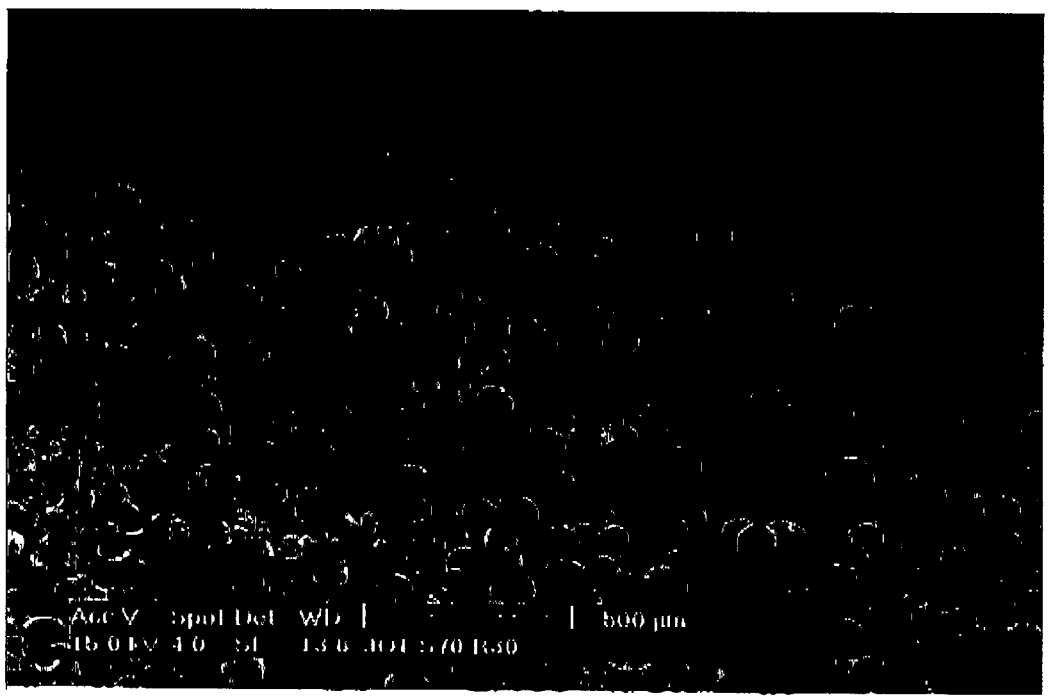

Under scanning electron microscopic examination, the syntactic foam had few broken spheres and a good microsphere packing structure as can be seen in FIG. 2.

Example 4

Resinox CL1916 phenolic resin was mixed with AH2070S acid hardener in a weight ratio of 100 parts resin to 10 parts hardener and mixed by hand using a bowl and a wooden spatula for a period of 3 minutes. 3M Scotchlite K1 soda-lime-borosilicate glass spheres were added slowly to the mixture to form a smooth viscous paste. Acetone was added to maintain a smooth consistency, and a further portion of the microspheres was added, followed by additional acetone. This process of alternating between addition of microspheres and acetone was continued until a mass fraction of spheres to resin of 0.80 to 0.20 was obtained. The mixture was stirred to maintain a smooth paste. The total amount of acetone added was twenty five milliliters. The mixture was then gently stirred for 10 minutes, and subsequently poured into a plaster mould. The specimen was then placed in an oven at 50° C. for a period of 24 hours. At this stage, the specimen was fully cured.

The resulting syntactic foam has the following properties:

| | |
|---|---|
| Sphere volume fraction | 0.335 |
| Resin volume fraction | 0.035 |
| Void fraction | 0.630 |
| Sphere Mass Fraction | 0.80 |
| Resin mass fraction | 0.20 |
| Foam Density (g/cm³) | 0.055 |
| Tactile Toughness | Soft |
| Colour | Pearl White |

Figure 3:
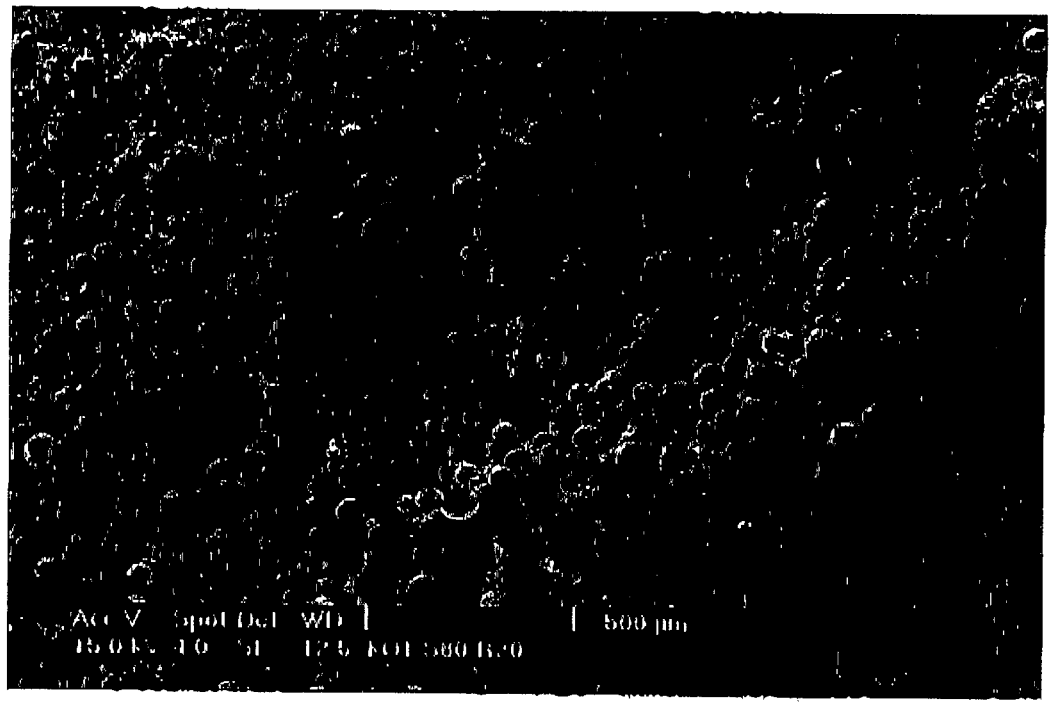

Under scanning electron microscopic examination, the syntactic foam had few broken spheres and a good microsphere packing structure as can be seen in FIG. 3.

Example 5

Resinox CL1916 phenolic resin was mixed with AH2070S acid hardener in a weight ratio of 100 parts resin to 10 parts hardener and mixed by hand using a bowl and a wooden spatula for a period of 3 minutes. A portion of an equivalent mass of 3M Scotchlite K1 soda-lime-borosilicate glass spheres were added slowly to the mixture to form a smooth viscous paste. Water was added to maintain a smooth consistency, and a further portion of the microspheres was added, followed by additional water. This process of alternating between addition of microspheres and water was continued until a mass of microspheres equivalent to the mass of resin had been added. The total volume of water added was fifteen milliliters. The mixture was then gently stirred for 15 minutes, and subsequently poured into a plaster mould. The specimen was then placed in an oven at 50° C. for a period of 24 hours. At this stage, the specimen was fully cured.

The resulting syntactic foam has the following properties:

| | |
|---|---|
| Sphere volume fraction | 0.472 |
| Resin volume fraction | 0.049 |
| Void fraction | 0.479 |
| Sphere Mass Fraction | 0.50 |
| Resin mass fraction | 0.50 |
| Foam Density (g/cm$^3$) | 0.118 |
| Tactile Toughness | Medium |
| Colour | Pearl White |

Figure 4:

Under scanning electron microscopic examination, the syntactic foam had many broken spheres as indicated in FIG. 4.

Example 6

Resinox CL1916 phenolic resin was mixed with AH2070S acid hardener in a weight ratio of 100 parts resin to 10 parts hardener and mixed by hand using a bowl and a wooden spatula for a period of 3 minutes. 3M Scotchlite K1 soda-lime-borosilicate glass spheres were added slowly to the mixture to form a smooth viscous paste. Water was added to maintain a smooth consistency, and a further portion of the microspheres were added, followed by additional water. This process of alternating between addition of microspheres and water was continued until a mass fraction of spheres to resin of 0.60 to 0.40 was obtained. The mixture was stirred to maintain a smooth paste. The total amount of water added was fifteen milliliters. The mixture was then gently stirred for 10 minutes, and subsequently poured into a plaster mould. The specimen was then placed in an oven at 50° C. for a period of 24 hours. At this stage, the specimen was fully cured.

The resulting syntactic foam has the following properties:

| | |
|---|---|
| Sphere volume fraction | 0.507 |
| Resin volume fraction | 0.035 |
| Void fraction | 0.542 |
| Sphere Mass Fraction | 0.60 |
| Resin mass fraction | 0.40 |
| Foam Density (g/cm$^3$) | 0.106 |
| Tactile Toughness | Medium |
| Colour | Pearl White |

Figure 5:
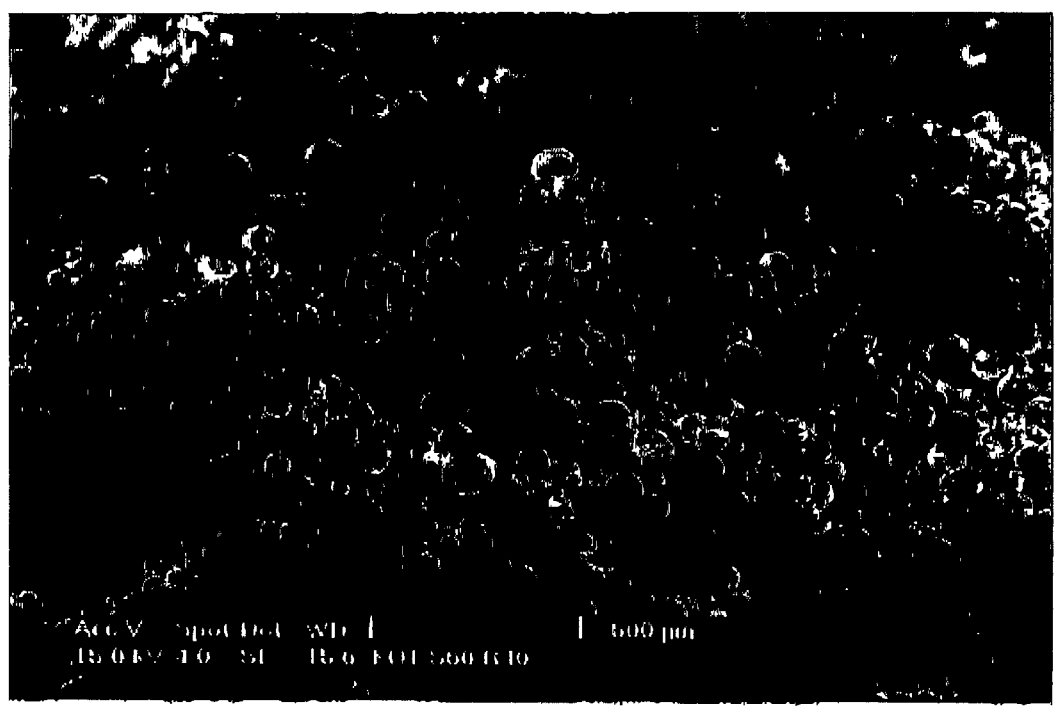

Under scanning electron microscopic examination, the syntactic foam had few broken spheres and a good microsphere packing structure as indicated in FIG. 5.

Example 7

Synapol 2120 epoxy resin was mixed with Synapol 2120 hardener in a weight ratio of two parts resin to one part hardener and mixed by hand using a bowl and a wooden spatula for a period of three minutes. 3M Scotchlite K1 soda-lime-borosilicate glass spheres were added slowly to the mixture to form a smooth viscous paste. Acetone was added to maintain a smooth consistency, and a further portion of microspheres was added, followed by additional acetone. This process of alternating between addition of microspheres and addition of acetone was continued until a mass of microspheres equivalent to the mass of resin had been added. The mixture was stirred to maintain a smooth paste. The total amount of acetone added was eighty milliliters. The mixture was then gently stirred for ten minutes, and subsequently poured into a plaster mould. The specimen was then left to air dry for a period of twenty-three hours. At this stage, the specimen was fully cured.

The resulting syntactic foam has the following properties:

| | |
|---|---|
| Sphere volume fraction | 0.296 |
| Resin volume fraction | 0.034 |
| Void fraction | 0.670 |
| Sphere Mass Fraction | 0.50 |
| Resin mass fraction | 0.50 |
| Foam Density (g/cm$^3$) | 0.0738 |
| Tactile Toughness | Medium |
| Colour | White |

Example 8

Synapol 2120 epoxy resin was mixed with Synapol 2120 hardener in a weight ratio of two parts resin to one part hardener and mixed by hand using a bowl and a wooden spatula for a period of three minutes. 3M Scotchlite K1 soda-lime-borosilicate glass spheres were added slowly to the mixture to form a smooth viscous paste. Acetone was added to maintain a smooth consistency, and a further portion of microspheres was added, followed by additional acetone. This process of alternating between addition of microspheres and addition of acetone was continued until a mass fraction of microspheres to resin of 0.60 to 0.40 was obtained. The mixture was stirred to maintain a smooth paste. The total amount of acetone added was ninety millimeters. The mixture was then gently stirred for ten minutes, and subsequently poured into a cement mould. The specimen was then left to air dry for a period of twenty-one hours. At this stage the specimen was fully cured.

The resulting syntactic foam has the following properties:

| | |
|---|---|
| Sphere volume fraction | 0.346 |
| Resin volume fraction | 0.026 |
| Void fraction | 0.628 |
| Sphere Mass Fraction | 0.60 |
| Resin mass fraction | 0.40 |
| Foam Density (g/cm$^3$) | 0.072 |
| Tactile Toughness | Medium |
| Colour | White |

Example 9

Synapol 2120 epoxy resin was mixed with Synapol 2120 hardener in a weight ratio of two parts resin to one part hardener and mixed by hand using a bowl and a wooden spatula for a period of three minutes. 3M Scotchlite K1 soda-lime-borosilicate glass spheres were added slowly to the mixture to form a smooth viscous paste. Acetone was added to maintain a smooth consistency, and a further portion of microspheres was added, followed by additional acetone. This process of alternating between addition of microspheres and addition of acetone was continued until a mass of microspheres equivalent to the mass of resin had been added. The mixture was stirred to maintain a smooth paste. The total amount of acetone added was eighty milliliters, mixture was then gently stirred for ten minutes, and subsequently poured into a plaster mould. The specimen was then left to air dry for a period of twenty-three hours. At this stage, the specimen was fully cured.

The resulting syntactic foam has the following properties:

| | |
|---|---|
| Sphere volume fraction | 0.289 |
| Resin volume fraction | 0.033 |
| Void fraction | 0.678 |
| Sphere Mass Fraction | 0.50 |
| Resin mass fraction | 0.50 |
| Foam Density (g/cm$^3$) | 0.072 |
| Tactile Toughness | Medium |
| Colour | White |

Example 10

Synapol 2120 epoxy resin was mixed with Synapol 2120 hardener in a weight ratio of two parts resin to one part hardener and mixed by hand using a bowl and a wooden spatula for a period of three minutes. 3M Scotchlite K1 soda-lime-borosilicate glass spheres were added slowly to the mixture to form a smooth viscous paste. Acetone was added to maintain a smooth consistency, and a further portion of microspheres was added, followed by additional acetone. This process of alternating between addition of microspheres and addition of acetone was continued until a mass fraction of spheres to resin of 0.60 0.40 was obtained. The mixture was stirred to maintain a smooth paste. The total amount of acetone added was ninety milliliters. The mixture was then gently stirred for ten minutes, and subsequently poured into a plaster mould. The specimen was then left to air dry for a period of twenty-one hours. At this stage, the specimen was fully cured.

The resulting syntactic foam has the following properties:

| | |
|---|---|
| Sphere volume fraction | 0.343 |
| Resin volume fraction | 0.026 |
| Void fraction | 0.631 |
| Sphere Mass Fraction | 0.60 |
| Resin mass fraction | 0.40 |
| Foam Density (g/cm$^3$) | 0.071 |
| Tactile Toughness | Soft |
| Colour | White |

Example 11

Synapol 2120 epoxy resin was mixed with Synapol 2120 hardener in a weight ratio of two parts resin to one part hardener and mixed by hand using a bowl and a wooden spatula for a period of three minutes. 3M Scotchlite K1 soda-lime-borosilicate glass spheres were added slowly to the mixture to form a smooth viscous paste. Acetone was added to maintain a smooth consistency, and a further portion of microspheres was added, followed by additional acetone. This process of alternating between addition of microspheres and addition of acetone was continued until a mass fraction of spheres to resin of 0.70 0.30 was obtained. The mixture was stirred to maintain a smooth paste. The total amount of acetone added was fifty milliliters. The mixture was then gently stirred for ten minutes, and subsequently poured into a plaster mould. The specimen was then left to air dry for a period of twenty hours. At this stage, the specimen was fully cured.

The resulting syntactic foam has the following properties:

| | |
|---|---|
| Sphere volume fraction | 0.389 |
| Resin volume fraction | 0.019 |
| Void fraction | 0.592 |
| Sphere Mass Fraction | 0.70 |
| Resin mass fraction | 0.30 |
| Foam Density (g/cm$^3$) | 0.069 |
| Tactile Toughness | Soft |
| Colour | White |

Accordingly, the present invention discloses methods of producing syntactic foams which are able to produce foam of low density using techniques which are ideally suited for large scale application. It is to be appreciated that variations and/or additions may be made to the parts and processes previously defined without departing from the spirit or ambit of the inventions as defined in the following claims.

What is claimed is:

1. A method of forming a syntactic foam including the steps of:
   (a) combining a polymer, microspheres and a solvent to form a slurry;
   (b) thereafter removing a portion of said solvent through a porous wick; and
   (c) applying conditions which substantially solidify said polymer.

2. The method of claim 1 wherein said polymer and microspheres are combined to form a paste, and thereafter the solvent is combined with said paste to form a slurry.

3. The method of claim 1 wherein said microspheres, said polymer and said solvent are combined together in incremental portions.

4. The method of claim 1 wherein the slurry is inserted in a mould having a desired physical shape, and the solvent is removed from said slurry while the slurry is in a mould to form a syntactic foam with a desired physical shape.

5. The method of claim 4 wherein said mould includes an inner surface in contact with said slurry, and said inner surface forms at least part of the porous wick.

6. The method of claim 1 wherein said porous wick is selected from plaster, clay, ceramic, cement, concrete, finely perforated plastic sheets with absorbent backing, finely perforated metallic sheets with absorbent backing, fine metallic mesh/gauze with absorbent backing, rigid porous foams or sponge-like material.

7. The method of claim 1 wherein said solvent is water or a volatile alcohol or a ketone.

8. The method of claim 1 wherein said solvent is selected from water, butyl alcohol, isopropyl alcohol, ethyl alcohol, methyl alcohol, acetone or mixtures thereof.

9. The method of claim 1 wherein said solvent is acetone.

10. The method of claim 1 wherein said polymer is a resin based compound.

11. The method of claim 10 wherein said resin based compound is selected from amino resins, epoxide resins, phenolic resins, tar acid resins, urea resins, melamine resins, vinyl resins, styrene resins, alkyd resins, acrylic resins, polyethylene resins, polypropylene resins, petroleum polymer resins, polyamide resins, polycarbonate resins, acetal resins, fluorohydrocarbon resins, polyester resins and polyurethane resins.

12. The method of claim 10 wherein said polymer is phenolic resin.

13. The method according to claim 1 wherein said polymer is a water soluble polymer.

14. The method according to claim 1 wherein said polymer further comprises a cross linking agent.

15. The method according to claim 1 wherein said microspheres are hollow gas filled spheres.

16. The method according to claim 14 wherein said gas filled spheres are selected from carbon, ceramic, phenolic, epoxy, or melamine-formaldehyde, soda-lime-borosilicate glass.

17. The method of claim 15 wherein said gas filled spheres are made of soda-lime-borosilicate glass.

18. The method of claim 1 wherein the surface of said microspheres is pre-coated with a silane coupling agent.

19. The method of claim 1 wherein the microspheres are less than 420 micrometers in diameter.

20. The method of claim 1 wherein the microspheres and polymer are combined in a weight ratio of between 8:2 and 2:8.

21. The method of claim 20 wherein the weight ratio of microspheres to polymer is between 8:2 and 6:4.

22. The method of claim 20 wherein the weight ratio of microspheres to polymer is between 8:2 and 7:3.

23. The method of claim 20 wherein the weight ratio of microspheres to polymer is between 1:1 and 2:8.

24. The method of claim 20 wherein the weight ratio of microspheres to polymer is between 4:6 and 2:8.

25. The method of claim 20 wherein the weight ratio of microspheres to polymer is between 3:7 and 2:8.

26. The method of claim 20 wherein the syntactic foam has total void spaces formed from interstitial voids between the microspheres, and microsphere void spaces within the microspheres, wherein the weight ratio of microspheres to polymer forms a syntactic foam with a total interstitial void space greater than the total microsphere void space.

27. The method of claim 1 wherein the syntactic foam has a density of between 0.05 and 0.5 grams/cm$^3$.

28. The method of claim 27 wherein the density of the syntactic foam is between 0.055 grams/cm$^3$ and 0.15 grams/cm$^3$.

29. A syntactic foam when made by a method including the steps of:
(a) combining a polymer, microspheres and a solvent to form a slurry;
(b) thereafter removing a portion of said solvent through a porous wick; and
(c) applying conditions which substantially solidify said polymer.

30. A syntactic foam wherein the syntactic foam has total void spaces formed from interstitial voids between the microspheres, and microsphere void spaces within the microspheres, and wherein the total interstitial void space is greater than the total microsphere void space.

31. A syntactic foam formed by a method including the steps of:
(a) combining a polymer, microspheres and a solvent to form a slurry;
(b) thereafter removing a portion of said solvent through a porous wick; and
(c) applying conditions which substantially solidify said polymer;
wherein the syntactic foam has total void spaces formed from interstitial voids between the microspheres, and microsphere void spaces within the microspheres, and wherein the total interstitial void space is greater than the total microsphere void space.

* * * * *